United States Patent
Lee et al.

(10) Patent No.: US 11,416,715 B2
(45) Date of Patent: Aug. 16, 2022

(54) APPARATUS AND METHOD FOR RECOGNIZING A FACE BASED ON ARTIFICIAL INTELLIGENCE

(71) Applicant: LG ELECTRONICS INC., Seoul (KR)

(72) Inventors: Jiwon Lee, Seoul (KR); Aram Kim, Seoul (KR); Jinkyoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 212 days.

(21) Appl. No.: 16/831,701

(22) Filed: Mar. 26, 2020

(65) Prior Publication Data

US 2021/0103778 A1    Apr. 8, 2021

(30) Foreign Application Priority Data

Oct. 7, 2019 (KR) .................. 10-2019-0123899

(51) Int. Cl.
*G06K 9/62* (2022.01)
*G06N 3/08* (2006.01)
*G06N 3/04* (2006.01)
*G06V 40/16* (2022.01)

(52) U.S. Cl.
CPC ......... *G06K 9/6265* (2013.01); *G06K 9/6257* (2013.01); *G06N 3/04* (2013.01); *G06N 3/08* (2013.01); *G06V 40/166* (2022.01); *G06V 40/172* (2022.01)

(58) Field of Classification Search
CPC ............. G06K 9/6265; G06K 9/00288; G06K 9/6257; G06K 9/00255; G06K 9/036; G06K 9/2027; G06K 9/00221; G06K 9/6262; G06K 9/00228; G06N 3/08; G06N 3/04; G06N 3/0454
USPC ........................................................ 382/118
See application file for complete search history.

(56) References Cited

U.S. PATENT DOCUMENTS

| | | | |
|---|---|---|---|
| 2007/0172099 A1* | 7/2007 | Park ................. | G06K 9/6234 382/118 |
| 2010/0329556 A1* | 12/2010 | Mitarai ............. | G06K 9/6251 382/170 |
| 2013/0315488 A1* | 11/2013 | Steinberg .......... | G06K 9/00 382/195 |

(Continued)

*Primary Examiner* — Juan A Torres
(74) *Attorney, Agent, or Firm* — Lee Hong Degerman Kang & Waimey

(57) ABSTRACT

The present disclosure relates to face recognition apparatus and method capable of increasing a rate of face recognition using artificial intelligence by changing a captured image or video in contrast value in a dynamic manner. An operational method of a face recognition electronic apparatus using an artificial neural network may include: receiving from an ISP an image processed based on a set contrast parameter; detecting a facial image from the image; determining match probability values between the detected facial image with a plurality of facial images; determining whether or not a subject matching with the detected facial image is present on the basis of the match probability values; and if not, changing the contrast parameter. Accordingly, the face recognition performance can be improved by correcting an image in contrast that provides the best face recognition capability for each image when identifying a subject of a facial image by using artificial intelligence.

18 Claims, 8 Drawing Sheets

(56) References Cited

U.S. PATENT DOCUMENTS

| | | | |
|---|---|---|---|
| 2015/0139492 A1* | 5/2015 | Murakami | G06K 9/3241 |
| | | | 382/103 |
| 2017/0206403 A1* | 7/2017 | Rambach | G06K 9/6215 |
| 2018/0276454 A1* | 9/2018 | Han | G06K 9/00281 |
| 2019/0377934 A1* | 12/2019 | Tseng | G06K 9/00268 |
| 2020/0265219 A1* | 8/2020 | Liu | G06K 9/00288 |

* cited by examiner 10　　　　　　31　　　　　　33　　　　　　20

APPARATUS AND METHOD FOR RECOGNIZING A FACE BASED ON ARTIFICIAL INTELLIGENCE

CROSS REFERENCE TO RELATED APPLICATION

Pursuant to 35 U.S.C. § 119(a), this application claims the benefit of earlier filing date and right of priority to Korean Patent Application No. 10-2019-0123899, filed Oct. 7, 2019, the contents of which are all hereby incorporated by reference herein in their entirety.

BACKGROUND

A face recognition technique is a technique of determining a subject matching with a facial image by automatically detecting and analyzing the facial image from an input static image or video, and has been studied for a long time in the field of pattern recognition and computer vision. Recently, the face recognition technology is used in various fields such as user authentication of a smart phone, commuting management, apartment entrance management, airport immigration management, etc. due to the ease of obtaining information.

Such a face recognition technique is relatively advanced technique than other object recognition techniques, and is known to show high recognition performance. However, there is still a problem in that the recognition performance is lowered due to a pose difference and/or a contrast difference between face images obtained in a practical environment or through the Internet.

SUMMARY

Various examples relate to a face recognition apparatus and method. More particularly, the present disclosure relates to a face recognition apparatus and method capable of increasing a rate of face recognition using artificial intelligence by dynamically changing a captured image or video in contrast.

Recently, a face recognition technique using deep learning of a deep neural network (DNN) has been developed. However, due to a contrast difference between an image used in deep learning and an image compared therewith, obtained features may be different, and thus face recognition performance can be significantly reduced.

Various examples of the present disclosure provide an apparatus and method of performing face recognition by using artificial intelligence, the apparatus and method being capable of improving identification performance by using a DNN when performing face detection and identification.

The technical problems solved by the present disclosure are not limited to the above technical problems and other technical problems which are not described herein will become apparent to those skilled in the art from the following description.

According to various examples of the present disclosure, there is provided a face recognition electronic apparatus using an artificial neural network, the apparatus including: a sensor capturing an image; an image signaling processor (ISP) performing image processing on the image captured by the sensor on the basis of a set contrast parameter; a memory for storing facial information of a plurality of subjects; and at least one processor connected to and operating in conjunction with the ISP and the memory, wherein the at least one processor: receives the processed image from the ISP; detects a facial image from the processed image; determines match probability values between the detected facial image with the plurality of subjects stored in the memory by using an artificial neural network for which first learning is performed; determines whether or not the subject matching with the detected facial image is present on the basis of the match probability values; and if not, changes the contrast parameter of the ISP.

According to various examples of the present disclosure, there is provided an operational method of a face recognition electronic apparatus using an artificial neural network, the method including: receiving from an ISP an image on which image processing is performed on the basis of a set contrast parameter; detecting a facial image from the image; determining match probability values between the detected facial image with a plurality of facial images of subjects stored in the memory by using an artificial neural network for which first learning is performed; determining whether or not a subject matching with the detected facial image is present on the basis of the match probability values; and if not, changing the contrast parameter.

According to various examples, when performing face identification by using artificial intelligence, face recognition performance can be improved by correcting each image in contrast capable of providing the best recognition performance.

Effects that may be obtained from the present disclosure will not be limited to only the above described effects. In addition, other effects which are not described herein will become apparent to those skilled in the art from the following description.

BRIEF DESCRIPTION OF THE DRAWINGS

In connection with the description of the drawings, the same or similar reference numerals may be used for the same or similar components.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Artificial intelligence refers to the field of researching artificial intelligence or the methodology to create the same, and machine learning refers to the field of defining various problems in the field of artificial intelligence and researching the methodology for solving the problems. Machine learning is defined as an algorithm that improves the performance of an operation by performing a consistent experience for the operation.

An artificial neural network (ANN) is a model used in machine learning, configured with artificial neurons (nodes) constituting a network in a synapse coupling, and means a model with problem solving ability. The artificial neural network may be defined by a connection pattern between neurons of other layers, a learning process of updating a model parameter, and an activation function generating an output value.

Figure 1:
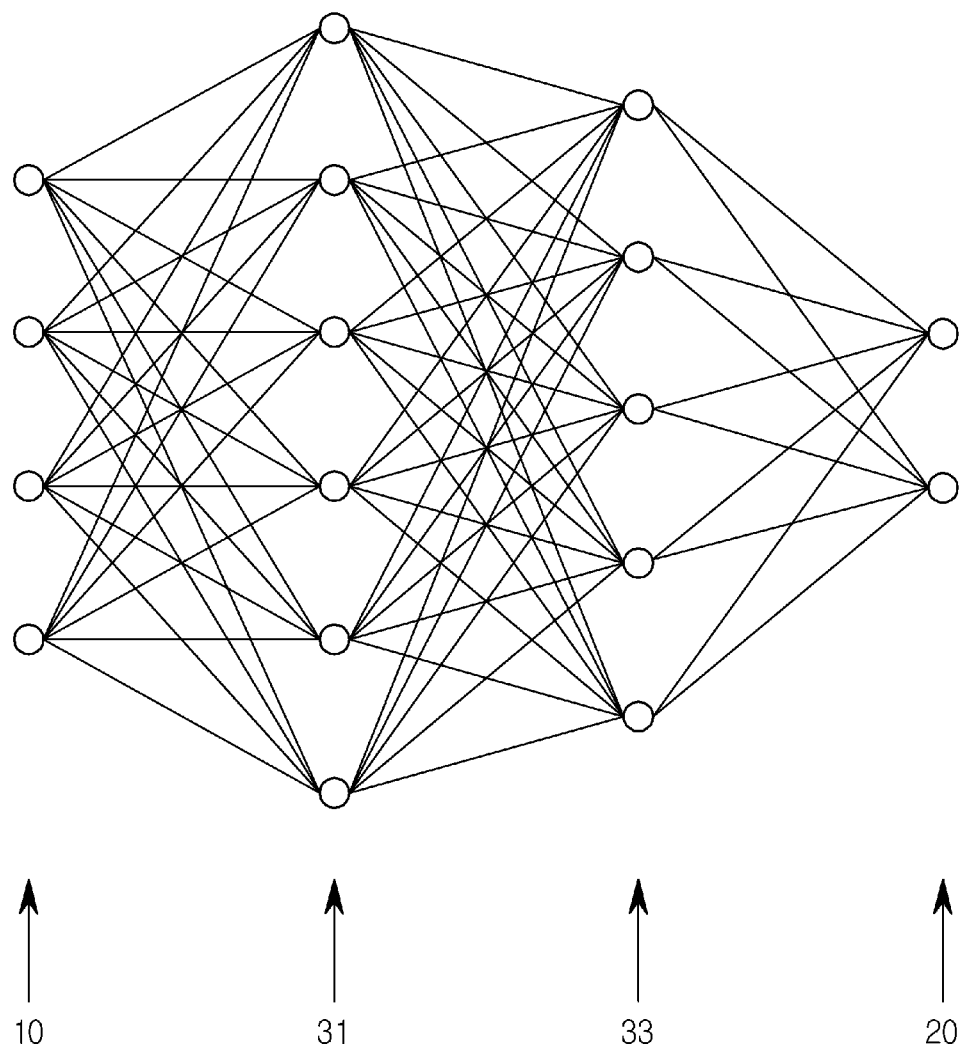
FIG. 1 is a view showing an example of a structure of a fully connected neural network.

FIG. 1 is a view showing an example of a structure of a fully connected neural network.

Referring to FIG. 1, an artificial neural network may include an input layer 10, an output layer 20, and may selectively include at least one hidden layers 31 or 33. Each layer may include at last one node associated with a neuron of the neural network, and the artificial neural network may include a synapse connected a node of one layer to a node of another layer. In the artificial neural network, a node may receive input signals which are input through the synapse, and generate an output value on the basis of a weighting factor for input signals and an activation function for a bias. An output value of each node may be used as an input signal of a subsequent layer through a synapse. An artificial neural network where all nodes of one layer and all nodes of a subsequent layer are connected with each other through a synapse may be referred to a fully connected neural network.

A model parameter of an artificial neural network may mean a parameter determined through learning, and include a weighting factor of a synapse connection, a bias of a neuron, etc. In addition, a hyper-parameter means a parameter that has to be set before performing learning in a machine learning algorithm, and includes a learning rate, a number of repetition times, a size of a mini-batch, an initialization function, etc.

Machine learning, among artificial neural networks, employed in a deep neural network (DNN) including a plurality of hidden layers, is referred to as deep learning, and the deep learning is a part of the machine learning. Hereinafter, machine learning is used to include deep learning.

Figure 2:
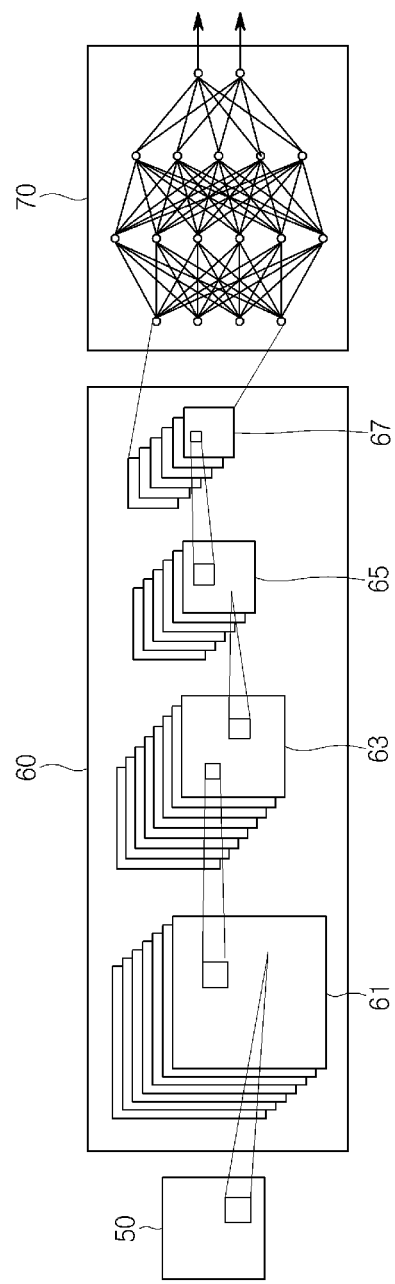
FIG. 2 is a view showing an example of a structure of a convolutional neural network (CNN) that is a kind of a deep neural network.

FIG. 2 is a view showing an example of a structure of a convolutional neural network (CNN) that is a kind of a deep neural network.

When identifying structural spatial data such as an image, a video, and a string, it may be efficient to use a structure of a convolutional neural network shown in FIG. 2. A feature with an adjacent image can be effectively recognized while maintaining spatial information of an image through a convolutional neural network.

Referring to FIG. 2, a convolutional neural network may include a feature obtaining layer 60 and a classification layer 70. The feature obtaining layer 60 may obtain a feature of an image 50 by combing features spatially close to the image by using convolutions.

The feature obtaining layer 60 may be configured with a plurality of convolutional layers 61 and 65 and a plurality of pooling layers 63 and 67 which are respectively stacked with each other. The convolutional layers 61 and 65 may be layers to which an activation function is applied after applying a filter to input data. The convolutional layers 61 and 65 may respectively include a plurality of channels, and each channel may be a channel to which a different filter and/or a different activation function is applied. A result of the convolutional layers 61 and 65 may be a feature map. A feature map may be data in a 2D matrix format. The pooling layers 63 and 67 may be used for reducing a size of output data of the convolutional layers 61 and 65, that is, reducing the output data in size by receiving the feature map, or for enhancing specific data. The pooling layers 63 and 67 may generate output data by applying max pooling selecting the largest value, average pooling selecting an average value, and min pooling selecting the smallest value from a part of output data of the convolutional layers 61 and 65.

A feature map generated by passing a series of convolutional layers and pooling layer may gradually decrease in size. A final feature map generated by passing the last convolutional layer and the last pooling layer may be converted into a 1D format so as be input to the classification layer 70. The classification layer 70 may have a structure of a fully connected neural network shown in FIG. 1. A number of input nodes of the classification layer 70 may be identical to a value obtained by multiplying a number of matrix elements of the final feature map with a number of channels.

As a structure of a deep neural network, in addition to the above-described convolutional neural network, a recurrent neural network (RNN), a long short term memory network (LSTM), gated recurrent units (GRU), etc. may be used.

An objective of performing learning for an artificial neural network is to determine a model parameter that minimizes a loss function. The loss function may be used as an index for determining an optimum model parameter in a learning process of the artificial neural network. In case of a fully connected neural network, a weighting factor for each synapse may be determined by learning, and in case of a convolutional neural network, a filter for obtaining a feature map, that is a filter of a convolutional layer, may be determined by learning.

Machine learning may be classified into supervised learning, unsupervised learning, and reinforcement learning according to a learning method.

Supervised learning may mean a method of learning an artificial neural network where a label on learning data is provided, and the label may mean a right answer (or result value) that has to be estimated by the artificial neural network when learning data is input to the artificial neural network. Unsupervised learning may mean a method of learning an artificial neural network where a label on learning data is not provided. Reinforcement learning may mean a learning method performing learning so as to select, by an agent defined under certain environment, an action or an order thereof such that an accumulated reward in each state is maximized.

Figure 3:
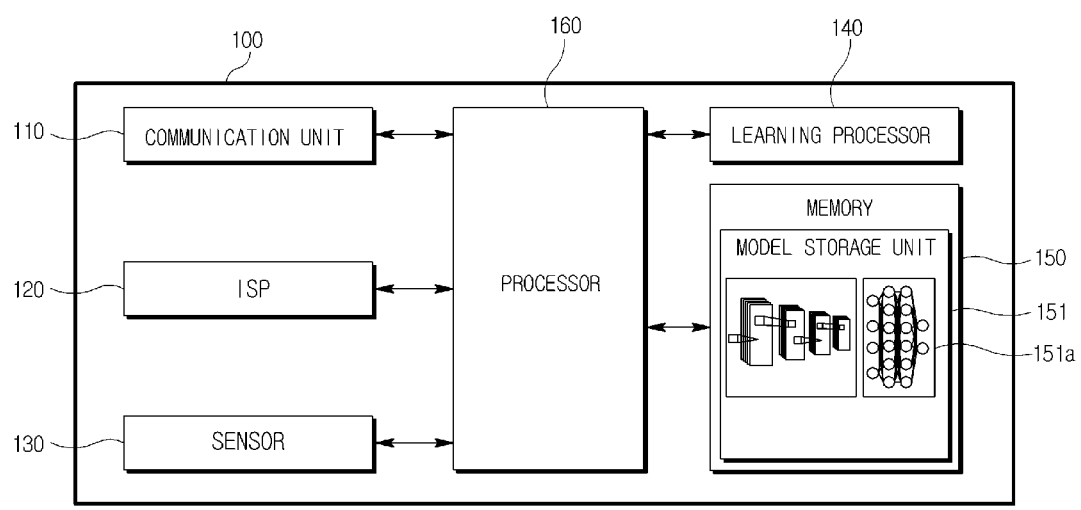
FIG. 3 is a view of a block diagram of a face recognition electronic apparatus 100 using a deep neural network according to various examples.

FIG. 3 is a view of a block diagram of a face recognition electronic apparatus 100 using a deep neural network according to various examples. A block diagram of FIG. 3 is a view of an example briefly showing configurations for face recognition, by an electronic apparatus 100, by using a deep neural network. According to an embodiment, some configurations may be omitted, and other configurations not shown may be added according to another embodiment. In addition, some configurations may be employed by being integrated into one chip, or a single configuration may be divided and employed as a plurality of chips or circuits.

Referring to FIG. 3, a face recognition electronic apparatus 100 using a deep neural network may include a communication unit 110, an ISP (image signaling processor) 120, a sensor 130, a learning processor 140, a memory 150, and a processor 160.

According to another embodiment, the ISP 120 and the sensor 130 may be a separate camera device at a remote position, including a communication unit so as to transfer captured images or videos by performing communication with the communication unit 110 of the main apparatus including the learning processor 140, the memory 150, and the processor 160, and to receive a parameter for the ISP 120. In an example, when the electronic apparatus is a doorbell, the camera device may be disposed in the front door, and the main apparatus may be disposed in a computer of the living room. The camera device and the main apparatus may transmit and receive data with each other by using wireless communication or wired communication, and use the data for identifying the visitor in front of the door.

The communication unit 110 may transmit and receive data to/from external apparatuses by using wired/wireless communication methods. For example, the communication unit 110 may perform communication with an external artificial intelligence server. When processing power of the face recognizing electronic apparatus 100 using the deep neural network is not enough to run a deep neural network algorithm, the deep neural network algorithm may be run in the external artificial intelligence server, and the electronic apparatus 100 may perform operations in conjunction with the external artificial intelligence server through the communication unit 110.

The communication unit 110 may use wireless communication methods including GEM (global system for mobile communication), CDMA (code division multi access), LTE (long term evolution), 5G, WLAN (wireless LAN), Wi-Fi (wireless-fidelity), or wired communication methods including LAN (local area network), WAN (wide area network), MAN (metropolitan area network), Ethernet, etc.

The sensor 130 may be an image sensor capable of capturing images or videos. The image sensor may be a CCD (charge-coupled device) sensor or CMOS (complementary metal-oxide-semiconductor) sensor. The sensor 130 may transfer captured image or video data to the ISP 120.

The ISP 120 may perform image processing on images or videos captured in the sensor 130. The ISP 120 may perform contrast correction, noise reduction, white balancing, CFA (color filter array) correction, gamma correction, etc. on the captured image. The ISP 120 may receive a parameter for correction, and the above parameter may be set by the processor 160. In an embodiment, the processor 160 may set a contrast tuning factor or a contrast parameter, and the ISP 120 may correct contrast of captured images or videos by using the contrast tuning factor or the contrast parameter.

The learning processor 140 may perform learning for a model 151*a* configured with an artificial neural network or deep neural network by using learning data, wherein the model 151*a* may be stored at model storage unit 151 in the memory 150.

According to an embodiment, a structure of the model 151*a* may be similar to that of FIG. 2. Herein, an input of the model 151*a* may be an image including facial information, and may be a 2D matrix including each pixel value of the image. Each node of an output of the model 151*a* may represent a probability value that matches a specific user. According to an embodiment, when facial information on four subjects which are the father, the mother, the daughter, and the son, is stored in a database, the model 151*a* may have four output nodes, and each node may output a value between 0 and 1. The first node may represent a probability that a facial image included in an input image corresponds to the father, the second node may represent a probability that a facial image included in an input image corresponds to the mother, the third node may represent a probability that a facial image included in an input image corresponds to the son, and the fourth node may represent a probability that a facial image included in an input image corresponds to the daughter. Herein, the closer to 1, the higher the probability is. According to another embodiment, when facial information of n persons are stored in the database, n output nodes may be present. According to another embodiment, an independent model may be present for each face of the n persons. In addition, an additional model for obtaining a face from an image may be present.

According to various embodiments, the learning processor 140 may perform learning for an artificial neural network by providing a facial image stored in the memory 150 or built in a database with a label to a model 151*a* configured with an artificial neural network or deep neural network. Herein, a label may refer to a specific subject associated with input data. In addition, the label may represent that a value of the output node associated with a specific subject corresponding to an input data is 1, and values of remaining output nodes may be set to 0. An artificial neural network or deep neural network for which learning is performed may be referred to as a trained model. A trained model may be employed in hardware, software, or combination thereof. The trained model may be used for estimating a result value for new input data other than learning data, and the estimated value may be used as a reference for performing a certain operation.

According to various examples, the learning processor 140 may use a trained model to identify a subject of a facial image included in an input image or video. The learning processor 140 may obtain at least one facial image from an input image or video, determine with which subject the obtained facial image matches among subjects stored in the database by using a trained model, and output the result.

According to various examples, the learning processor 140 may be integrated with the processor 160 of the electronic apparatus 100 so as to be employed in a single chip. In addition, a trained model executed in the learning processor 140 may be employed in hardware, software, or combination thereof. When a part or the entire of a trained model is employed in software, at least one instruction constituting the trained model may be stored in the memory 150, an external memory directly connected to the electronic apparatus 100, or a memory maintained in the external apparatus. The learning processor 140 may operate an artificial intelligence processing program by loading a corresponding instruction from the memory and executing the instruction.

In the memory 150, data providing various functions of the electronic apparatus 100 may be stored. For example, in the memory 150, a database of facial information, a trained model, a learning history, an instruction for the learning processor 140, an instruction for the processor 160, a model (or artificial neural network) for which leaning is ongoing or performed, etc. may be stored. Herein, according to an example, the database of facial information may be a database generated by collecting facial image information through the Internet. According to another example, the database of facial information may be a database generated by storing facial images included in an image or video previously captured by electronic apparatus 100 through the sensor 130.

The processor 160 may determine at least one executable operation of the electronic apparatus 100 on the basis of information determined or generated by using a learning mode based on a data analysis algorithm or machine learning algorithm. In addition, the processor 160 may perform the determined operation by controlling configurations of the electronic apparatus 100. A program used by the processor 160 when performing the operation may be stored in the memory 150.

The processor 160 may request, retrieve, receive, or use data of the learning processor 140 or memory 150, and control configurations of the electronic apparatus 100 so as to perform the estimated operation of the at least one executable operation, or an operation that is determined to be desirable.

The processor 160 may provide to the ISP 120 a parameter required to the ISP 120.

In order to perform the determined operation, the processor 160 may generate, when association with an external apparatus is required, a control signal for controlling the corresponding external apparatus, and transmit the generated control signal to the corresponding external apparatus.

The processor 160 may collect record information including operation content of the electronic apparatus 100 and user's feedback associated with the operation, etc. so as to store in memory 150 or learning processor 140. The collected record information may be used when updating a trained model.

The processor 160 may control a part of configurations of the electronic apparatus 100 so as to execute application programs stored in the memory 150. In addition, the processor 160 may operate configurations of the electronic apparatus 100 by combining at least two thereof so as to execute the application programs.

The processor 160 may execute a trained model for identifying a subject of a facial image included in the captured image or video.

Figure 4:
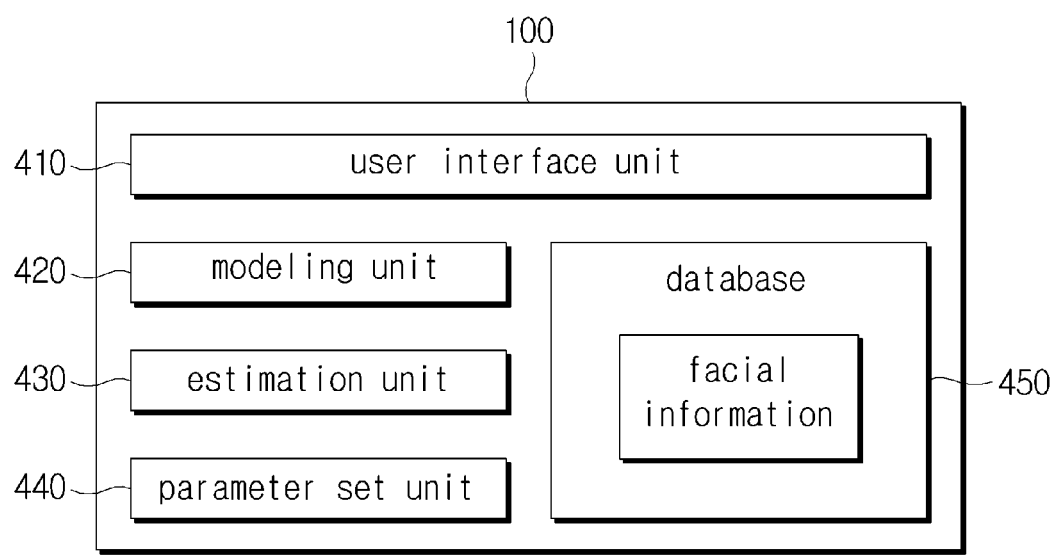
FIG. 4 is a view of a block diagram showing functions performing, by a processor of the electronic apparatus and/or a learning processor, recognizing a facial image included in an image or video according to various examples.

FIG. 4 is a view showing a block diagram of functions performed, by the processor 160 and/or the learning processor 140 of the face recognition electronic apparatus 100, a facial image included in an image or video according to various examples. A block diagram of FIG. 4 is an example briefly showing software configurations required for detecting, by the electronic apparatus 100, a facial image included in an image or video, and identifying a subject of the facial image. According to an embodiment, some configurations may be omitted, and other configurations not shown may be added according to another embodiment. In addition, some configurations may be employed by being integrated into one chip, or a single configuration may be divided and employed as a plurality of chips or circuits. Each configuration shown in FIG. 4 may be employed in a separate program or some configurations may be employed in one program by being closely related with each other.

Referring to FIG. 4, the processor 160 and/or the learning processor 140 of the face recognition electronic apparatus 100 using the deep neural network may perform a function of at least one of a user interface unit 410, a modeling unit 420, an estimation unit 430, and a parameter set unit 440. A database 450 may include facial information required for performing the above functions.

According to various examples, the modeling unit 420 may generate a trained model for a facial recognition on the basis of a deep neural network. The trained model may be generated on the basis of facial information stored in the database 450. The modeling unit 420 may generate a model on the basis of a deep neural network, and set various hyper parameters, and model parameters. The modeling unit 420 may generate a trained model which is trained based on a supervised learning using facial information stored in the database 450 and label information. According to an embodiment, data input to a model may be a pixel value of a preset 2D matrix structure, and the model may output a value between 0 and 1 representing a probability matching with information on each facial image stored in the database. Accordingly, the trained model may have a number of output nodes corresponding to a number of face images stored in the database, and each output node may output a match probability with the information on the corresponding facial image.

According to another embodiment, the modeling unit 420 may additionally generate a trained model for face detection on the basis of a deep neural network. A trained model for face detection may perform a function of detecting a facial image from an input image or video, and displaying the detected facial image. According to an embodiment, the detected facial image may be displayed in a bounding box. When a plurality of facial images is detected from the input image or video, a trained model for face detection may detect each of the plurality of facial images, and display the detected images. The modeling unit 420 may generate a trained model for face detection on the basis of facial image information stored in the database 450. According to an embodiment, the modeling unit 420 may generate a trained model for face detection by providing information on all facial images stored in the database 450 as learning data.

According to various examples, the modeling unit 420 may be executed by the learning processor 140 or processor 160.

According to various examples, the estimation unit 430 may estimate to whom a facial image present in an image or video input from the ISP 120 corresponds.

For the same, the estimation unit 430 may perform two operations of detecting a facial image present in the input image or video, and identifying a subject of the detected facial image. According to an embodiment, the estimation unit 430 may additionally correct a position of the detected facial image, and perform projection for the detected facial image so as to identify the subject.

The estimation unit 430 may detect a facial image by providing an image or video received from the ISP 120 to a trained model for face detection generated in the modeling unit 420. When a plurality of facial images is included in an image or video, the estimation unit 430 may detect a plurality of facial image.

When necessary, the estimation unit 430 may correct a position of each of the plurality of detected facial images, and perform projection therefor. Generally, in case of facial information stored in the database 450, a subject generally looks straight ahead. On the contrary, when a subject of the input image or video does not look straight ahead, a feature obtained from the input image may not match with that stored in the database, and thus a position of the detected facial image may be corrected to be similar to the facial information stored in the database 450.

The estimation unit 430 may identify a subject associated with each of the detected facial image. The estimation unit 430 may provide the detected facial image to a face identification learning mode generated in the modeling unit 420, and obtain a match probability with facial information stored in the database 450 from the trained model for face identification. The estimation unit 430 may identify a subject associated with the highest matching probability as the subject of the detected facial image. However, when a plurality of subjects is present associated with the match probability, the estimation unit 430 may instruct the parameter set unit 440 to set again a parameter of the ISP 120.

According to an embodiment, when the match probability of the detected facial image is 0.9 associated with the father, but 0.2 associated with the mother, 0.4 associated with the son, and 0.1 associated with the daughter, the estimation unit 430 may determine that the detected facial image corresponds to the father.

According to another embodiment, when a match probability of the detected facial image is 0.5 associated with the father, 0.4 associated with the mother, 0.3 associated with the son, and 0.35 associated with the daughter, it is not reasonable for the estimation unit 430 to determine that the detected facial image corresponds to the father. Herein, the estimation unit 430 may instruct the parameter set unit 440 to set again a parameter of the ISP 120, and repeat the process of identifying a subject of the detected facial image by receiving an image or video which is corrected based on the reset parameter. When correction is performed on the same image or video on the basis of the reset parameter, the facial image does not change in position in the image or video input to the estimation unit 430. Accordingly, the estimation unit 430 may omit the face detection operation.

The above-described face detection operation and parameter resetting instruction of the estimation unit 430 may be repeated until a match probability becomes reasonable with a specific subject, or may be repeated a preset number of times. When a reasonable match probability is not obtained even though the above operation is repeated a preset number of times, a subject associated with the highest match probability of the final result may be identified as the subject. Herein, for a condition for determining whether or not being reasonable, it may be determined to be reasonable when a difference between the highest probability value and another probability value is equal to or greater than a preset value, or when the highest probability value is equal to or greater than a preset value.

Figure 5:
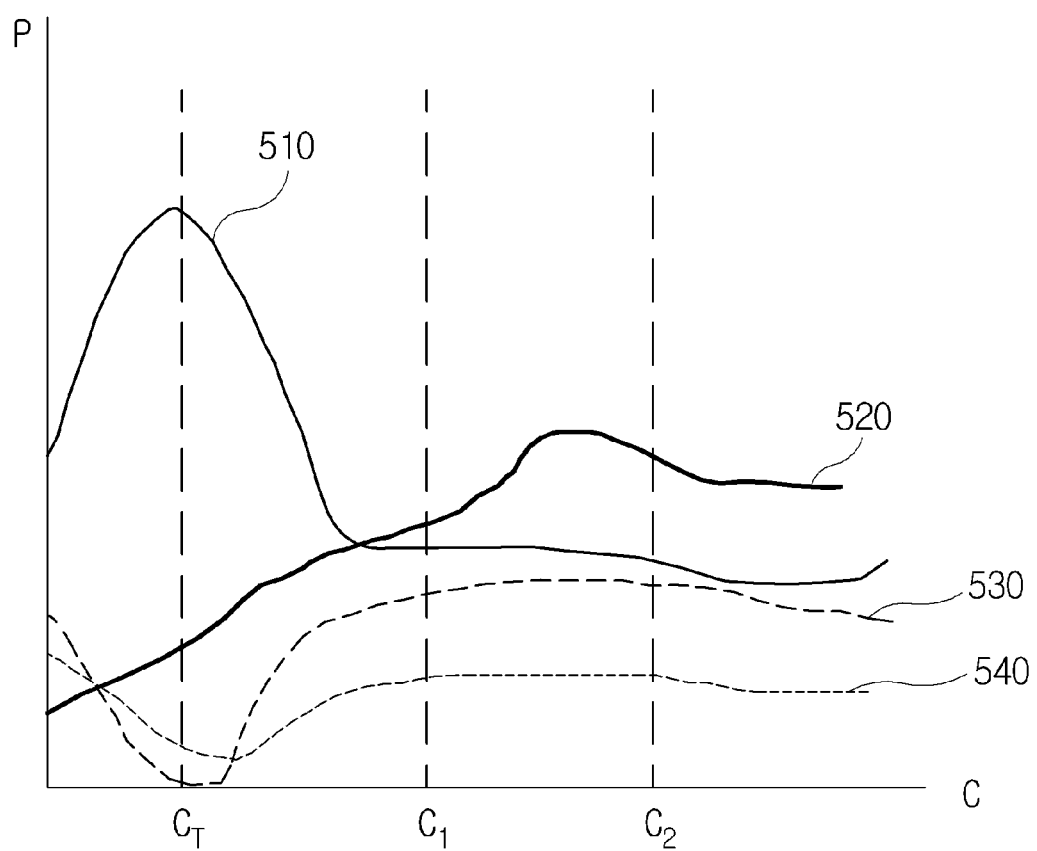
FIG. 5 is a view showing an example of changes in match probabilities output from a trained model for face recognition according to a change in parameter value.

FIG. 5 is a view showing an example of changes in match possibilities 510, 520, 530, and 540 output from a trained model for face recognition according to a change in parameter.

Referring to FIG. 5, when parameter values are respectively C1 and C2, it may be determined that, for four subjects stored in the database, the input image does not match with relatively high match probability any of subjects. It may be determined that it is not reasonable to determine that a facial image included in the input image or video corresponds to a subject (for example, the mother) that is associated with the highest match probability 520. On the other hand, when a parameter value is CT, the facial image has the highest match probability 510 with one person (for example, the father) among four subjects stored in the database, but low match probabilities 520, 530, and 540 with other subjects (for example: the mother, the son, and the daughter). Accordingly, the estimation unit 430 may determine that it is reasonable to identify the subject of the face image included in the image or video as that person (for example, the father).

The match probability varies according to a change in parameter as above since it is not provided that how the parameter (for example, contrast) associated with a facial image stored in the database is set, and the parameter associated with each stored facial image may be different. Meanwhile, a parameter value when performing capturing by using the sensor 130 may differ with a parameter value of the facial image stored in the database, and thus recognition performance may be degraded because the obtained features are different. Accordingly, recognition performance can be improved by setting the corresponding parameter of the image or video captured by using the sensor 130 to be similar to the parameter of the facial image associated with the subject which is stored in the database.

Accordingly, the estimation unit 430 may change the corresponding parameter in setting, repeat the obtaining of the match probability, and determine the optimum parameter so as to finally improve the recognition performance.

The parameter set unit 440 may change the ISP 120 in parameter setting on the basis of the instruction of the estimation unit 430. A major parameter of the ISP 120 set by the parameter set unit 440 may be contrast. The ISP 120 may correct contrast of a captured or currently being captured image or video on the basis of the set contrast parameter. The contrast parameter may have a relative value rather than an absolute value. According to an embodiment, the contrast parameter may have a value between 0 and 100. Herein, 0 may mean the darkest luminance provided by the ISP 120, and 100 may mean the brightest luminance provided by the ISP 120. A value between 0 and 100 may correspond to a linearly proportional value between the darkest contrast and the brightest contrast. According to another embodiment, when a contrast parameter is 50, the ISP 120 may transfer an image or video captured by the sensor 130 as it is to the processor 160 without correcting the contrast thereof. When a contrast parameter is smaller than 50, the ISP 120 may correct the contrast of the captured image or video to be relatively dark, and when a contrast parameter is greater than 50, the ISP 120 may correct the contrast of the captured image or video to be relatively bright.

The parameter set unit 440 may change the contrast parameter from the current contrast value to a new contrast value according to various methods on the basis of the instruction of the estimation unit 430.

According to an embodiment, on the basis of a result obtained by comparing the contrast of the facial image stored in the database which is associated with the highest match probability with the contrast of the input image or video, the contrast parameter may be set such that the contrast of the image or video corrected by the ISP 120 becomes be close to the contrast of a facial image associated with the highest match probability. For example, when the contrast of the input image or video is brighter than the stored image, the parameter set unit 440 may reset the contrast parameter to be darker than before. On the contrary, when the contrast of the input image or video is darker than the stored image, the parameter set unit 440 may reset the contrast parameter to be brighter than before.

Figure 6:
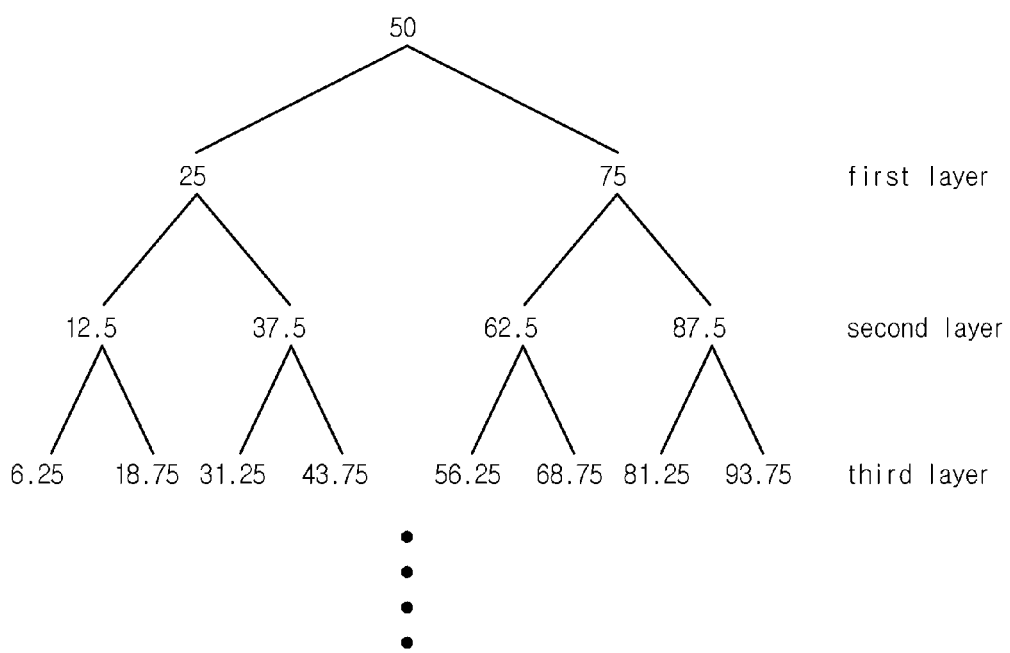
FIG. 6 is a view of a flow showing an example of changing a parameter value according to a tree structure according to various examples.

According to another embodiment, the parameter set unit 440 may set a subsequent contrast parameter by using a tree structure. For example, when a current contrast parameter is 50, a subsequent contrast parameter may be set to at least one of 25 and 75 in the same interval in both sides. When a reasonable match probability is not obtained by the above setting, and thus the estimation unit 430 instructs resetting of the parameter, resetting may be performed by using the remaining one of the 25 and 75. When a reasonable match probability is not obtained by performing the above-described resetting for two times, the parameter set unit 440 may sequentially set the parameter as at least one of 12.5, 37.5, 62.5, and 87.5. In the present example, a parameter value may be determined according to a tree structure shown in FIG. 6. Referring to FIG. 6, it is shown that the parameter value becomes halved as going down by one layer.

According to another embodiment, as a variation of the above, in each layer, when setting the parameter, the parameter set unit 440 may use a value of a lower layer associated with a parameter value from which a higher match probability is obtained. For example, in a first layer of FIG. 6, the parameter value may be set to 25 and 75, and then match probabilities associated therewith may be compared. When the match probability associated with 75 is obtained to be higher than the other one, in a subsequent layer (second layer), the parameter value may be set to 62.5 and 87.5 associated with 75 so as to determine the match probabilities. Similarly, when the match probability associated with 62.5 is obtained to be higher than the other one in the second layer, in a subsequent layer (third layer), the parameter value may be set to 56.25 and 68.75 so as to determine match probabilities.

According to another embodiment, the parameter set unit 440 may set the parameter value to an arbitrary value that is randomly selected. For example, at least one of 0, 10, 20, 30, 40, 60, 70, 80, 90, and 100 may be randomly selected and the selected value may be set to a subsequent parameter value. When a subject with a reasonable match probability is not determined in the present setting, the parameter set unit 440 may randomly select one value excluding the previously selected parameter value, and set the selected value as a subsequent parameter value. In addition, the above setting may be repeated on the basis of the instruction of the estimation unit 430.

For a method of selecting, by the parameter set unit 440, a subsequent parameter value, an arbitrary method, other than the above-described method, may be used. However, it may be reasonable to use a method capable of minimizing a number of parameter values that are used until a subject with the reasonable match probability is determined. This is because the face identification speed of the face recognition apparatus proposed in the present disclosure is determined on the basis of the above.

According to various examples, the estimation unit 430 may operate by the learning processor 140 or processor 160.

According to various examples, the user interface unit 410 may provide a recognition result to the user. The user interface unit 410 may display to the user a subject associated with a facial image included in an image or video captured by using the sensor 130, and how much the match probability is.

Figure 7:
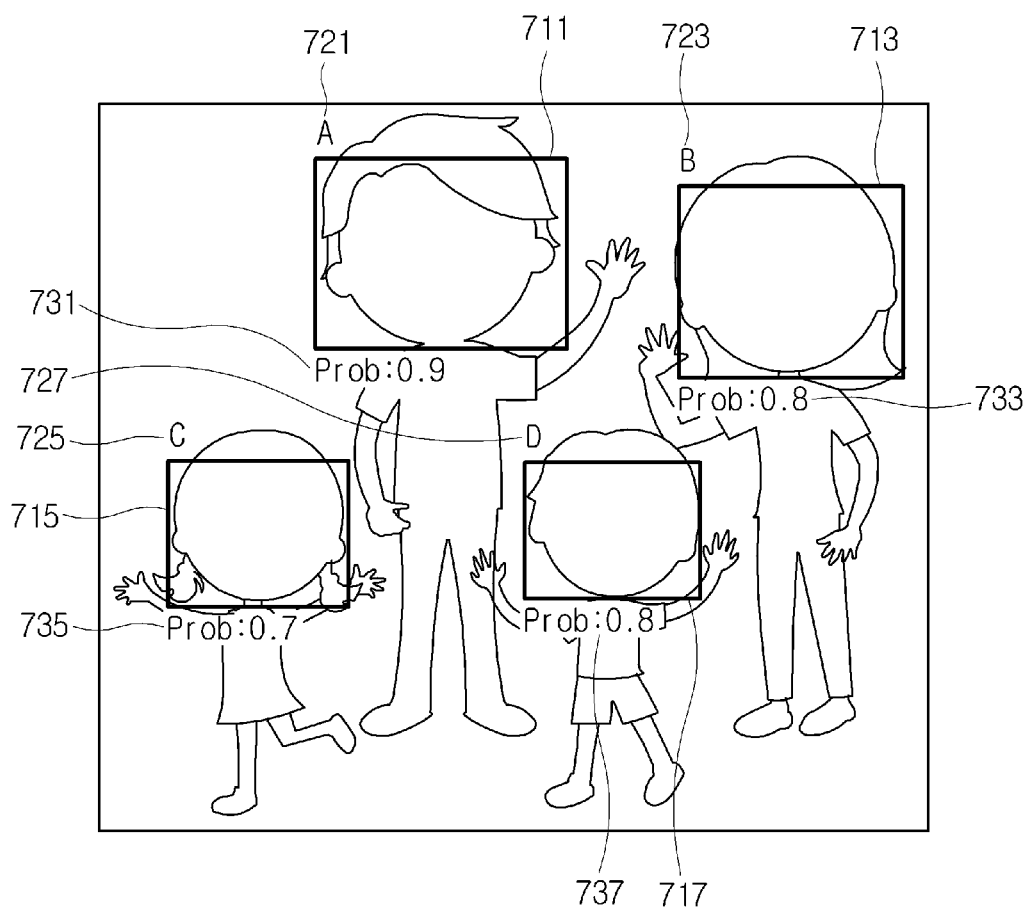
FIG. 7 is a view showing an example of displaying a captured image and a recognition result.

FIG. 7 is a view showing an example of displaying a captured image and the recognition result.

Referring to FIG. 7, the face recognition electronic apparatus according to the present disclosure, first, may detect facial images from an image captured by the sensor 130, and display boxes 711, 713, 715, and 717 on the detected facial images. Subsequently, for the respective detected facial image, the face recognition electronic apparatus may represent with whom the detected facial images respectively correspond among subjects 721, 723, 725, 727 stored in the database, and match probabilities 731, 733, 735, and 737 therewith.

An example shown in FIG. 7 is an embodiment, according to another embodiment, match probabilities 731, 733, 735, and 737 associated with subjects may not be displayed. In addition, according to still another embodiment, the boxes 711, 713, 715, and 717 may not be provided.

According to various examples, an electronic apparatus that recognizes a facial image of a person by using an artificial neural network (for example, electronic apparatus 100 of FIG. 3) includes: a sensor capturing an image (for example, the sensor 130 of FIG. 3); an ISP performing image processing on the image captured by the sensor on the basis of a set contrast parameter (for example, the ISP 120 of FIG. 3), a memory for storing facial information on a plurality of subjects (for example, the memory 150 of FIG. 3); and at least one processor connected to and operating in conjunction with the ISP and the memory (for example, the learning processor 140 and/or the processor 160 of FIG. 3), wherein the at least one processor may: receive the image on which image processing is performed from the ISP; detect a facial image from the processed image; determine match probability values between the detected facial image with the plurality of subjects stored in the memory by using an artificial neural network for which first learning is performed; determine whether or not a subject matching with the detected facial image is present on the basis of the match probability values; and if not, change the contrast parameter of the ISP.

According to various examples, the at least one processor may detect the facial image by using an artificial neural network for which second learning is performed which is separate from the artificial neural network for which first learning is performed.

According to various examples, the at least one processor may determine that a subject associated with the highest match probability value corresponds to the subject of the facial image when the highest match probability value is greater than a first preset threshold value among the match probability values, and determine that the subject matching with the detected facial image is present.

According to various examples, the at least one processor may determine that a subject associated with the highest match probability value corresponds to the subject of the facial image when a difference between the highest match probability value and the second highest match probability value is greater than a second preset threshold value among the match probability values, and determine that the subject matching with the detected facial image is present.

According to various examples, the at least one processor may determine that a subject associated with the highest match probability value corresponds to the subject of the facial image when the highest match probability value is greater than a third preset threshold value, and a difference between the highest match probability value and the second highest match probability value is greater than a fourth preset threshold value among the match probability values, and determine that the subject matching with the detected facial image is present.

According to various examples, the at least one processor may display on a screen the processed image and information on the subject that matches with the detected facial image when it is determined that the subject matching with the detected facial image is present.

According to various examples, when it is determined that the subject matching with the detected facial image is not present, the at least one processor may repeat: changing the contrast parameter of the ISP; receiving the image from the ISP which is processed on the basis of the changed contrast parameter; detecting the facial image from the processed image; determining match probability values between the detected facial image with the plurality of subjects stored in the memory by using the artificial neural network for which the first learning is performed; determining whether or not the subject matching with the detected facial image is present on the basis of the match probability values; and if not, changing the contrast parameter of the ISP until the subject matching with the detected facial image is detected.

According to various examples, when it is determined that the subject matching with the detected facial image is not present after repeating the process for a preset times, the at least one processor may determine that the subject associated with the highest match probability value, among the match probability values, corresponds to the subject of the facial image, and determine that the subject matching with the detected facial image is present.

According to various examples, when a plurality of facial images is detected from the processed image, for the respective plurality of facial images, the at least one processor may determine match probability values between the detected facial image with the plurality of subjects stored in the memory by using the artificial neural network for which the first learning is performed; determine whether or not the subject matching with the detected facial image is present on the basis of the match probability values; and if not, change the contrast parameter of the ISP.

Figure 8:
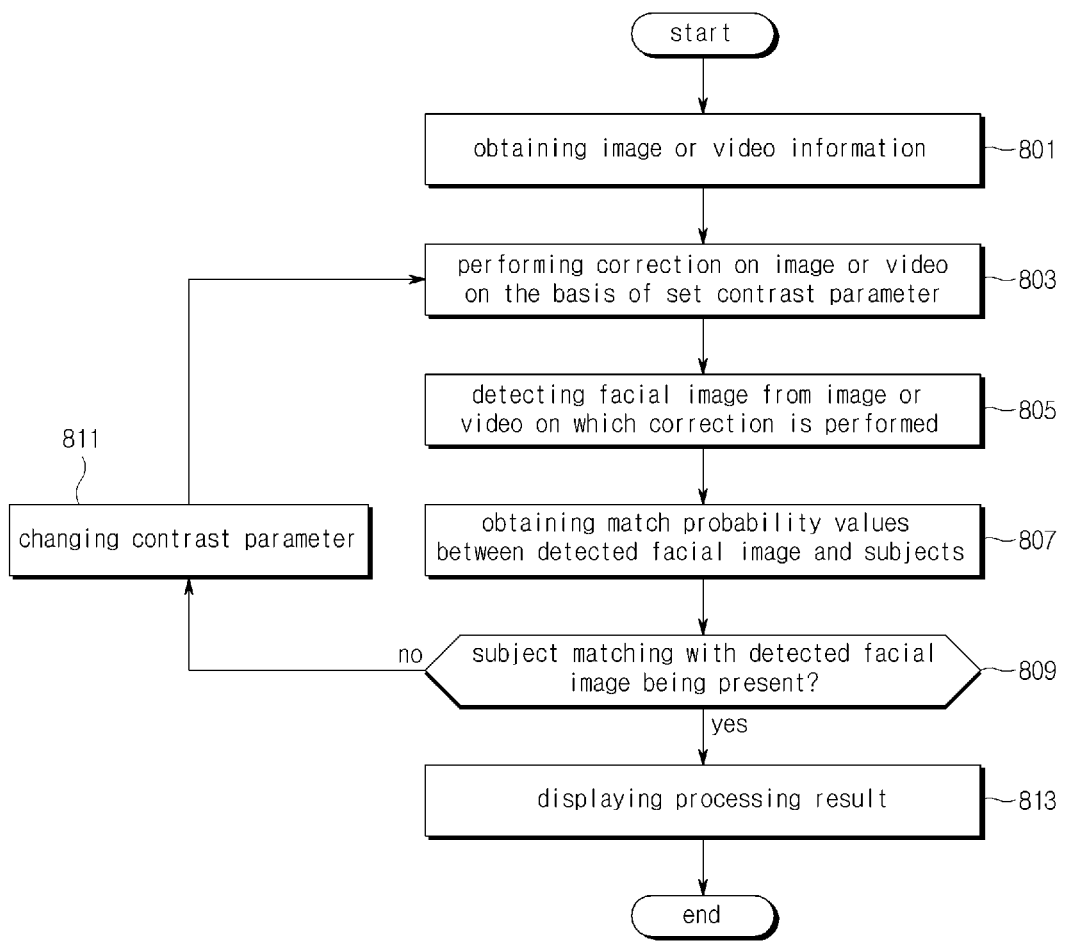
FIG. 8 is a view of a flowchart showing operations of the electronic apparatus of performing face recognition on an image captured by the sensor according to various examples.

FIG. 8 is a view of a flowchart showing operations of the electronic apparatus 100 performing face recognition on an image captured by the sensor according to various examples.

Referring to FIG. 8, in 801, the electronic apparatus 100 may obtain image or video information. The image or video information may be obtained by the sensor 130.

According to various examples, in 803, the electronic apparatus 100 may perform correction on the image or video obtained through the sensor 130 according to a contrast value set in a contrast parameter of an ISP. According to an embodiment, a default contrast value may be applied to the obtained original image or video. The default contrast value may be used for maintaining the image or video as it is without correcting contrast thereof. According to an embodiment, when a range of the contrast value is from 0 to 100, the default contrast value may be referred to setting the contrast parameter to 50. When the set contrast value becomes close to 0, the contrast becomes dark, and when the set contrast value becomes close to 100, the contrast becomes bright. According to another embodiment, a range of the contrast value may be from −50 to 50, and the default contrast value may be referred to setting the contrast parameter to 0. In addition, when the set contrast value becomes close to −50, the contrast becomes dark, and when the set contrast value becomes close to 50, the contrast becomes bright.

According to various examples, in 805, the electronic apparatus 100 may detect a facial image from the image or video on which correction is performed in 803. According to an embodiment, when a plurality of facial images is included, each of the plurality of facial images may be detected. The electronic apparatus 100 may use a conventional vision algorithm for detecting a facial image, or may detect a facial image by using an artificial neural network. According to an embodiment, when a facial image is detected by using an artificial neural network, the electronic apparatus 100 may detect a facial image by using a trained model for which learning is performed in advance. Learning for a model may be performed, by an external server, by using various types of learning data. A trained model for which learning is performed may be stored in the memory 150 and used by being executed by the electronic apparatus 100.

In 805, the electronic apparatus 100 may additionally perform correction on the detected facial image on the basis of a position of a subject image stored in a database. According to an embodiment, when a facial image of the subject stored in a database looks straight ahead but the detected facial image is looking left or right, the detected facial image may be corrected to look straight ahead.

According to various examples, in 807, the electronic apparatus 100 may obtain, for the detected facial image, match probability values associated with facial images of subjects stored in the database. The electronic apparatus 100 may use a trained model that is an artificial neural network model for which learning is performed so as determine a match probability. A trained model may be an artificial neural network model for which learning is performed in advance by using facial images of subjects stored in the database. Herein, the artificial neural network model may be a deep artificial neural network model, or may also be a convolutional neural network model. According to an embodiment, learning for an artificial neural network model may be directly performed by the present apparatus. However, according to another embodiment, learning for an artificial neural network model may be performed by an external artificial intelligence sever, rather than the present apparatus, by using facial images of subjects stored in the database. A final trained model may be stored in the memory 150 of the electronic apparatus 100.

In 807, the trained artificial neural network model executed by the electronic apparatus 100 may provide a match probability value between the detected facial image and the facial image of the subject stored in the database. A match probability value may have a value between 0 and 1, and when the value is close to 1, the match probability may be high. According to an embodiment, when facial images of four subjects, which are the father, the mother, the son, and the daughter, are stored in the database, the electronic apparatus 100 may obtain a match probability value of the detected facial image associated with the father, the mother, the son, and the daughter by using a trained model.

According to various examples, in 809, the electronic apparatus 100 may determine whether or not a subject matching with the detected facial image is present. According to an embodiment, in 807, the trained model may provide a probability PA representing a probability that the detected facial image matches with the father, a probability PB with the mother, a probability PC with the son, and a probability PD with the daughter. The electronic apparatus 100 or processor of the electronic apparatus 100 may determine whether or not the subject matching with the detected facial image is present on the basis of the values provided as above. In an embodiment, the electronic apparatus 100 may select a specific subject as a subject matching with the detected facial image when a match probability (for example: 0.9) of the specific subject is greater than a match probability (for example: 0.1, 02, and 0.4) of another subject by at least a preset value (for example: 0.4), and determine that the subject matching with the detected facial image is present. According to another embodiment, the electronic apparatus 100 may select a specific subject as a subject matching with the detected facial image when a match probability (for example: 0.85) of the specific subject is greater than a preset value (for example: 0.8), and determine that the subject matching with the detected facial image is present. According to still another embodiment, by combining the above-described examples, the electronic apparatus 100 may select a specific subject as a subject matching with the detected facial image when a match probability of the specific subject is greater than a preset value (for example: 0.8) and greater than a match probability of another subject by at least a preset value (for example: 0.4), and determine that the subject matching with the detected facial image is present.

According to various examples, in 809, when the electronic apparatus 100 determines that the subject matching with the detected facial image is not present (809-NO), in 811, the electronic apparatus 100 may change the contrast parameter for image or video correction. When the contrast of the captured image or video and the contrast of the facial image stored in the database are different, a feature obtained from the image may be different. Accordingly, in order to increase a match probability, the electronic apparatus 100 may correct the contrast of the captured image or video to be similar to the contrast of the facial image stored in the database.

The electronic apparatus 100 may repeat 803 to 811 as changing the contrast parameter of the ISP for image correction, and determine whether or not the subject matching with the detected facial image is present. According to an embodiment, when it is determined that the subject matching with the detected facial image is still not present after repeating a preset number of times, in order to reduce time to face recognition, rather than performing more repetition, a subject associated with the highest match probability may be determined as the subject of the detected facial image by using a final result as it is.

When a plurality of facial images is detected from the obtained image or video in 801, 803 to 811 may be repeated for each of the plurality of facial images, and subjects associated with all of the detected facial images may be determined, and the result may be displayed in 813.

According to an embodiment, the electronic apparatus 100 may display the result by overlapping the result on the captured image or video as shown in FIG. 7 by using AR (argument reality).

By using the operational method shown in FIG. 8 of the above-described electronic apparatus 100 proposed in the present disclosure, an error can be reduced and a face recognition rate can be improved when identifying a subject of a facial image included in an image or video captured by the sensor 130.

According to various examples, an operational method of a face recognition electronic apparatus using an artificial neural network may include: receiving from the ISP an image on which image processing is performed on the basis of a set contrast parameter; detecting a facial image from the image; determining match probability values between the detected facial image with a plurality of facial images of subjects stored in the memory by using an artificial neural network for which first learning is performed; determining whether or not a subject matching with the detected facial image is present on the basis of the match probability values; and if not, changing the contrast parameter.

According to various examples, the detecting of the facial image from the image may include: detecting the facial image by using an artificial neural network for which second learning is performed which is separate from the artificial neural network for which first learning is performed.

According to various examples, the determining of whether or not the subject matching with the detected facial image is present may include: determining that a subject associated with the highest match probability value corresponds to the subject of the facial image when the highest match probability value is greater than a first preset threshold value among the match probability values; and determining that the subject matching with the detected facial image is present.

According to various examples, the determining of whether or not the subject matching with the detected facial image is present may include: determining that the subject associated with the highest match probability value corresponds to the subject of the facial image when a difference between the highest match probability value and the second highest match probability value is greater than a second preset threshold value among the match probability values; and determining that the subject matching with the detected facial image is present.

According to various examples, the determining of whether or not the subject matching with the detected facial image is present may include: determining that the subject associated with the highest match probability value corresponds to the subject of the facial image when the highest match probability value is greater than a third preset threshold value, and a difference between the highest match probability value and the second highest match probability value is greater than a fourth preset threshold value among the match probability values; and determining that the subject matching with the detected facial image is present.

According to various examples, the operational method may further include: displaying on a screen the processed image and information on the subject that matches with the detected facial image when it is determined that the subject matching with the detected facial image is present.

According to various examples, when it is determined that the subject matching with the detected facial image is not present, the changing of the set contrast parameter of the ISP and the receiving of the image from the ISP which is processed on the basis of the changed contrast parameter; the detecting of the facial image from the processed image; the determining of the match probability values between the detected facial image with the plurality of subjects stored in the memory by using the artificial neural network for which the first learning is performed; the determining of the whether or not the subject matching with the detected facial image is present on the basis of the match probability values; and if not, the changing of the contrast parameter is repeated until the subject matching with the detected facial image is detected.

According to various examples, when it is determined that the subject matching with the detected facial image is still not present after repeating the process for a preset times, the operational method may further include: determining that the subject associated with the highest match probability value, among the match probability values, corresponds to the subject of the facial image; and determining that the subject matching with the detected facial image is present.

According to various examples, when a plurality of facial images is detected from the processed image, the operational method may include: for the respective plurality of facial images, determining match probability values between the detected facial image with the plurality of subjects stored in the memory by using the artificial neural network for which the first learning is performed; determining whether or not the subject matching with the detected facial image is present on the basis of the match probability values; and if not, changing the contrast parameter.

As described above, an apparatus and method proposed in the present disclosure can increase a match probability by changing an input image or video in contrast on the basis of a match probability output from an artificial neural network when performing face recognition by using artificial intelligence, and thus a recognition rate of a facial image included in the image or video can be increased.

What is claimed is:

1. A facial recognition electronic apparatus using an artificial neural network, the facial recognition electronic apparatus comprising:
a sensor configured to capture an image;
an image signaling processor (ISP) configured to perform image processing on the captured image based on contrast parameters;
a memory for storing facial information of a plurality of subjects sourced from different people; and
at least one processor configured to:
receive a first processed image from the ISP processed based on a first contrast parameter;
detect a facial image from the first processed image;
determine match probability values between the detected facial image with the stored facial information of the plurality of subjects sourced from different people by using a first artificial neural network trained to determine a match probability by using the stored facial information of the plurality of subjects;
determine whether a subject among the plurality of subjects matching with the detected facial image is present based on the determined match probability values;
based on a determination that the subject matching with the detected facial image is not present,
receive a second processed image from the ISP processed by the ISP on the captured image based on a second contrast parameter;
detect an additional facial image from the second processed image; and
determine the match probability value between the detected additional facial image with the stored facial image of the plurality of subjects sourced from different people by using the first artificial neural network.

2. The facial recognition electronic apparatus of claim 1, wherein the at least one processor is further configured to: detect the facial image by using a second artificial neural network trained separately from the first artificial neural network.

3. The facial recognition electronic apparatus of claim 1, wherein the at least one processor is further configured to:
determine that a subject associated with a highest match probability value corresponds to the subject of the detected facial image based on the highest match probability value among the match probability values being greater than a first preset threshold value; and
determine that the subject matching with the detected facial image is present.

4. The facial recognition electronic apparatus of claim 1, wherein the at least one processor is further configured to:
determine that a subject associated with a highest match probability value corresponds to the subject of the detected facial image based on a difference between the highest match probability value and a second highest match probability value among the match probability values being greater than a second preset threshold value; and
determine that the subject matching with the detected facial image is present.

5. The facial recognition electronic apparatus of claim 1, wherein the at least one processor is further configured to:
determine that a subject associated with a highest match probability value corresponds to the subject of the detected facial image based on the highest match probability value being greater than a third preset threshold value, and a difference between the highest match probability value and a second highest match probability value being greater than a fourth preset threshold value; and
determine that the subject matching with the detected facial image is present.

6. The facial recognition electronic apparatus of claim 1, wherein the at least one processor is further configured to: cause a display of the processed image and information on the subject that matches with the detected facial image on a display based on a determination that the subject matching with the detected facial image is present.

7. The facial recognition electronic apparatus of claim 1, wherein based on a determination that the subject matching with the detected facial image is not present, the at least one processor is further configured to repeat:
changing the contrast parameter of the ISP;
receiving the image from the ISP which is processed based on the changed contrast parameter;
detecting the facial image from the processed image;
determining match probability values between the detected facial image with the plurality of subjects stored in the memory by using the first artificial neural network;
determining whether or not the subject matching with the detected facial image is present based on the match probability values; and
changing the contrast parameter of the ISP until the subject matching with the detected facial image is detected based on a determination that no subject matches with the detected facial image.

8. The facial recognition electronic apparatus of claim 7, wherein based on a determination that the subject matching with the detected facial image is not present after performing repetition for a preset number of times, the at least one processor is further configured to:
determine that the subject associated with a highest match probability value among the match probability values corresponds to the subject of the facial image; and
determine that the subject matching with the detected facial image is present.

9. The facial recognition electronic apparatus of claim 1, wherein when a plurality of facial images is detected from the processed image for the respective plurality of facial images, the at least one processor is further configured to:

determine match probability values between the detected facial image with the plurality of subjects sourced from different people by using the first artificial neural network; and change the contrast parameter of the ISP based on a determination that no subject matches with the detected facial image according to the match probability values.

10. An operational method of a face recognition electronic apparatus using an artificial neural network, the operational method comprising:

receiving from an image signaling processor (ISP) a first processed image on which image processing is performed based on a first contrast parameter;

detecting a facial image from the first processed image;

determining match probability values between the detected facial image with a plurality of facial images of subjects sourced from different people by using a first artificial neural network trained to determine a match probability by using the plurality of facial images of the subjects, wherein the plurality of facial images of subjects are stored in a memory;

determining whether a subject matching with the detected facial image is present based on the determined match probability values; and based on a determination that the subject matching with the detected facial image is not present, receiving a second processed image from the ISP on which image processing is performed based a second contrast parameter, detecting an additional facial image from the second processed image, and determining the match probability value between the detected additional facial image with the plurality of facial images of subjects sourced from different people by using the first artificial neural network.

11. The operational method of claim 10, wherein the detecting of the facial image from the image includes: detecting the facial image by using a second artificial neural network trained separately from the first artificial neural network.

12. The operational method of claim 10, wherein the determining of whether the subject matching with the detected facial image is present comprises: determining that a subject associated with a highest match probability value corresponds to the subject of the detected facial image based on the highest match probability value among the match probability values being greater than a first preset threshold value; and determining that the subject matching with the detected facial image is present.

13. The operational method of claim 10, wherein the determining of whether the subject matching with the detected facial image is present comprises:

determining that a subject associated with a highest match probability value corresponds to the subject of the detected facial image based on a difference between the highest match probability value and a second highest match probability value being greater than a second preset threshold value; and determining that the subject matching with the detected facial image is present.

14. The operational method of claim 10, wherein the determining of whether the subject matching with the detected facial image is present comprises:

determining that a subject associated with a highest match probability value corresponds to the subject of the facial image based on the highest match probability value being greater than a third preset threshold value, and a difference between the highest match probability value and a second highest match probability value being greater than a fourth preset threshold value; and determining that the subject matching with the detected facial image is present.

15. The operational method of claim 10, the method further comprising:

displaying, on a screen, the processed image and information on the subject that matches with the detected facial image based on a determination that the subject matching with the detected facial image is present.

16. The operational method of claim 10, wherein based on a determination that the subject matching with the detected facial image is not present, the method is further configured to repeat:

the changing of the contrast parameter of the ISP and the receiving of the image from the ISP which is processed on based on the changed contrast parameter;

the detecting of the facial image from the processed image;

the determining of the match probability values between the detected facial image with the plurality of subjects stored in the memory by using the first artificial neural network;

the determining of the whether the subject matching with the detected facial image is present based on the match probability values; and the changing of the contrast parameter until the subject matching with the detected facial image is detected based on a determination that no subject matches with the detected facial image according to the match probability values.

17. The operational method of claim 16, further comprising:

based on a determination that the subject matching with the detected facial image is not present after performing repetition for a preset number of times, determining that the subject associated with a highest match probability value corresponds to the subject of the facial image, and determining that the subject matching with the detected facial image is present.

18. The operational method of claim 10, wherein when a plurality of facial images is detected from the processed image, the method performs: for the respective plurality of facial images, the determining of match probability values between the detected facial image with the plurality of subjects sourced from different people by using the first artificial neural network and changing of the contrast parameter based on a determination that no subject matches with the detected facial image.

* * * * *